(12) United States Patent
Tilscher et al.

(10) Patent No.: US 7,081,689 B2
(45) Date of Patent: Jul. 25, 2006

(54) CONTROL SYSTEM FOR A WIND POWER PLANT WITH HYDRODYNAMIC GEAR

(75) Inventors: Martin Tilscher, Heidenheim (DE); Andreas Basteck, Lörrach (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 11/019,508

(22) Filed: Dec. 22, 2004

(65) Prior Publication Data
US 2005/0194787 A1 Sep. 8, 2005

(30) Foreign Application Priority Data
Dec. 23, 2003 (DE) ................. 103 61 443

(51) Int. Cl.
*F03D 7/00* (2006.01)
(52) U.S. Cl. .......................... 290/44; 290/55
(58) Field of Classification Search ...... None
See application file for complete search history.

(56) References Cited

U.S. PATENT DOCUMENTS

| | | | | |
|---|---|---|---|---|
| 2,176,105 A | * | 10/1939 | Heinrich | 475/53 |
| 4,219,308 A | * | 8/1980 | Bottrell | 416/43 |
| 4,333,018 A | * | 6/1982 | Bottrell | 290/55 |
| 4,513,206 A | * | 4/1985 | Gervasio et al. | 290/4 C |
| 4,565,929 A | * | 1/1986 | Baskin et al. | 290/44 |
| 4,774,855 A | * | 10/1988 | Murrell et al. | 475/31 |
| 5,222,924 A | * | 6/1993 | Shin et al. | 475/329 |
| 2003/0159438 A1 | * | 8/2003 | Vogelsang et al. | 60/330 |
| 2005/0146141 A1 | * | 7/2005 | Basteck | 290/44 |

FOREIGN PATENT DOCUMENTS

| | | |
|---|---|---|
| DE | 4029722 A1 * | 3/1992 |
| EP | 635639 A1 * | 1/1995 |
| JP | 2004162652 A * | 6/2004 |
| WO | WO 9630669 A1 * | 10/1996 |

* cited by examiner

*Primary Examiner*—Joseph Waks
(74) *Attorney, Agent, or Firm*—Ohlandt, Greeley, Ruggiero & Perle, L.L.P.

(57) ABSTRACT

A wind power plant connectable to an electric grid is provided that has at least three control levels. A controller controls an angular position of the rotor blades and/or controls a setting of the reaction member of the hydrodynamic speed transformer and/or controls the power electronics of the generator. The controller is provided with predetermined setpoint characteristics depending on operating states of the wind power plant and/or the electric grid or characteristics of the wind.

12 Claims, 10 Drawing Sheets

CONTROL SYSTEM FOR A WIND POWER PLANT WITH HYDRODYNAMIC GEAR

RELATED APPLICATIONS

This application claims priority in German Application No. DE 103 61 443.5, filed on Dec. 23, 2003, the disclosures of which are incorporated herein by reference.

BACKGROUND OF THE INVENTION

1. Field of the Invention

The invention relates to a control system for a wind power plant with a hydrodynamic gear in the drive train between wind rotor and a generator connected to the electric mains with fixed frequency.

2. Description of the Related Art

If attention is given to the special system characteristics of wind power plants with respect to the power input side first, there is a particularity, in addition to the progress over time of typically strongly fluctuating power potential of the air flow, in the power conversion of the mechanical power of the air flow into the mechanical power of the wind rotor. In this respect it is possible to associate each flow speed of the driving air flow with an optimal speed-to-torque ratio for the wind rotor, which on its part depends on the geometry and design of the wind rotor. The progress curve describing an optimal speed of the wind rotor, which depends on the wind speed, is known as parabolics. The term of an efficiency-optimal speed is used in the present application for a rotor speed following said parabolics.

The conversion of the mechanical power of a wind power plant into electric power by means of an electric generator leads to a further requirement placed on wind power plants because the connection of the electric generator to an electric interconnected network grid also requires the observance of a constant system frequency.

When coupling an electric generator to the mains network, a first solution is to provide the entire drive train of the wind power plant (and thus also the wind rotor) in a fixed-speed manner. Such fixed-speed wind power plants can be connected easily to the electric interconnected network grid by using asynchronous generators on the basis of slip caused by this principle. The constancy of the speed on the drive train is transmitted by the gear onto the wind rotor, so that the wind rotor does not run over its performance optimum at different wind speeds.

An especially disadvantageous aspect in fixed-speed wind power plants is that they can only be operated with reduced efficiency under partial load, which occurs frequently under typical wind conditions.

If a wind power plant is operated in general and in particular in the partial-load range with a variable rotor speed, there is either the possibility to provide a drive train with variable or constant initial speed, which leads to a variable or constant generator speed. The output also changes over time in both cases due to the time-varying moment.

The first case leads in wind power plants to the use of frequency converters, which excite the generator with the required frequency or provide compensations to the difference of the existing system frequency and thus realize a speed-variable generator. This approach leads away from the problem to be solved here and is linked to special problems such as the complex open-loop and closed-loop control circuits, the adversely reflected parabolic characteristics of the wind rotor in the frequency converter, the stiffness of the defined generator characteristics by the frequency converter, the lower operational reliability in the case of serious environmental restrictions, a mains supply quality to be operated with high effort such as the occurrence of only few harmonics and a low production of reactive power.

The second approach, namely combining a variable rotor speed of the wind power plant with a constant generator speed without the use of a frequency converter, corresponds to the topic represented herein of a wind power plant with variable input speed and constant output speed. The known solutions of this problem use a superposition gear, which branches the mechanical power. Only two approaches based on this have become known in connection with speed-variable wind power plants, which are used for keeping constant the generator frequency.

In the first system the input power via the superposition gear is divided among a large generator and a small servomotor, with approximately 30% of the input power being usually transmitted to the servomotor. The generator is connected with a fixed frequency to the electric network, whereas the servomotor is connected via a frequency converter to the mains network or is supplied via an auxiliary generator, which is mechanically coupled to the generator. For the purpose of stabilizing the generator speed, the servomotor is operated as a motor or as a generator with different frequencies. Such a system has the same problems as wind power plants with frequency-controlled generators.

In a second system, which works in a hydrostatic manner, hydraulic motors and pumps are used instead of the electric servomotor. This system also has the problem of difficult control characteristics, especially a sluggish response behavior and relevant idle times and strong non-linearities. Moreover, the hydraulic system components are disadvantageous due to the constructional complexity.

In addition to the above requirements placed on the control system of a wind power plant, which arise from an efficiency-optimal guidance of the speed and the use of a generator connected to the mains network, there are further requirements placed on control system, which arise from different operating ranges and operating states of a wind power plant. In the present application, the term of operating ranges is seen depending on the available wind and the degree of capacity utilization of the wind power plant. Three different, mutually adjacent operating ranges are distinguished below in an exemplary manner. They are designated by being sorted from low to high wind speeds as partial load range or parabolic load operation, speed-guided range for noise reduction and performance-limited full load range. The different operating states of a wind power plant must be distinguished from this. This can be the start phase, the synchronization phase, the stop phase or a braking of the wind power plant until standstill. Further operating states can arise from the requirements of mains network connection. This can concern a load rejection, a short circuit, a reactive power requirement or a power reduction.

SUMMARY OF THE INVENTION

The invention is based on the object of providing a control system for a wind power plant, which allows the operation of a speed-constant, mains-coupled generator in conjunction with an efficiency-optimized speed guidance of the wind rotor for the partial load range. A control system is further to be provided simultaneously which is also suitable for speed reduction for noise limitation and for full load operation. Furthermore, the control system should be suitably adjustable to all operating ranges and states occurring during the operation of a wind power plant.

In order to achieve these objects, the inventors have recognized that a control system, which is suitable for a wind power plant must be composed of at least three control levels.

The first control level consists of the wind rotor and the mains-coupled generator, which in accordance with the invention are coupled via a drive train. This represents a combination of a power split gear and a hydrodynamic Föttinger speed transformer. This first control level has a behavior, which allows guiding the rotor speed in an efficiency-optimal manner and to ensure at the same time a constant generator speed. This is achieved according to a possible embodiment by the following configuration of the drive train:

The input shaft of the power split gear is connected at least indirectly with the wind rotor of the wind power engine. Possible intermediate members between the wind rotor and the input of the power split gear can be speed-transforming gears. Rigid coupling is also possible.

Two power branches are formed in the power split gear, which can be configured as a planetary gear with variable gear ratio. The output shaft of the drive train is driven in the first power branch with mechanical power by the wind rotor, with said output shaft being coupled at least indirectly with the electric generator. It is necessary that the output shaft for the generator drive revolves at a constant speed. In order to achieve this, a hydrodynamic converter is driven at least indirectly with its pump impeller by the output of the drive train, with there being a direct coupling between output shaft and pump impeller. This requires that the output shaft is speed-transformed in the power split gear with a speed which is considerably higher in comparison with the speed of the input shaft. A typical speed of the electric generator is 1500 rpm for example. With such high speeds on the output shaft it is possible to provide an effective operation of the hydrodynamic Föttinger speed transformer.

Depending on the position of a reaction member of the hydrodynamic Föttinger speed transformer, which is typically a guide wheel with guide blades, there is a specific power absorption of the pump and thus connected power transmission to the turbine wheel of the hydrodynamic Föttinger speed transformer. This leads to the consequence that as a result of the system-inherent characteristics of the power conversion from air flow to the kinetic energy of a wind rotor and the system characteristics of the speed transformer, the transmission ratios in the power split gear and the reaction member of the hydrodynamic transformer can be set in such a way that by means of system-inherent control effect of the speed transformer in conjunction with the superposition gear in general and in particular in the partial-load range of the wind power plant it is possible to achieve an optimal input speed for the wind rotor on the input shaft of the drive train with the impressed constant generator speed on the output shaft of the drive train. This leads to the consequence that wind rotor and speed transformer as turbo machines have the same characteristics of speed/power and speed/moment and identical behaviors are required for the control as a result of their identical system behavior.

The drive train with power split gear and hydrodynamic speed transformer with tap on the output shaft and power return flow onto the power split gear is designed by adjustment of the mechanical gear components in such a way that the optimal absorption characteristics of the wind rotor, which in an approximated manner has a parabolic curve, are reflected by the drive train. A variable power input, the guidance of the wind rotor along the optimal speed for power input and a constant generator speed can be achieved for such an adjusted drive train for a substantially constant setting of the reaction member of the hydrodynamic speed transformer. This effect, which merely leads to a self-regulation of the output speed of the drive train depending on the design, can be explained in such a way that the hydrodynamic speed transformer which allows power to flow back to the power split gear also has parabolic characteristics. Consequently, there is no control in the actual sense with a desired/actual value for the first control level. There is actually only a control of the reaction member of the hydrodynamic speed transformer or its setting to a substantially constant value which is associated with the speed guidance of the wind rotor along the parabolics. Accordingly, the term self-regulation is used for the first control level in the present application.

A second control level in accordance with the invention comprises a controller for the rotor blade position, a controller for the position of the reaction member of the hydrodynamic speed controller and a controller for the power electronics of the generator. The controllers of said second control level are loop controllers in the actual sense because they perform a comparison of setpoint and actual values and emit actuating signals. In accordance with the invention, the controllers of the second control level are not simultaneously active for all operating ranges or operating states and do not have the same weighting. In the transition between operating states or operating ranges it is further preferable that a graduated transition occurs in the controller weighting.

A third control level is assigned the task in accordance with the invention to control the selection of the controllers of the second control level depending on the different operating ranges and operating states and to determine their weighting or respective graduated transition. Moreover, the third control level determines the setpoint values, the operating points and preferably also the controller settings for the second control level.

In an exemplary embodiment of the wind power plant that is connectable to an electric grid, there is provided at least three control levels. The first control level has a wind rotor with rotor blades, a power split gear driven at least indirectly by the wind rotor, a hydrodynamic speed transformer and a generator with power electronics. The power split gear has first and second power branches. The hydrodynamic speed transformer has a reaction member that takes up power from the first power branch and produces a feedback of power via the second power branch to the power split gear depending on a setting of the reaction member. The generator is driven at least indirectly by the first power branch and emitting electric power to the electric grid with constant system frequency. The second control level has a controller that controls an angular position of the rotor blades and/or controls a setting of the reaction member of the hydrodynamic speed transformer and/or controls the power electronics of the generator. The third control level activates and deactivates the controller of the second control level and/or predetermines the setpoint characteristics for the controller of the second control level depending on operating states of the wind power plant and/or the electric grid and/or characteristics of the wind.

The controller of the second control level can be deactivated for a normal operating state and partial load conditions, with the angular position of the rotor blades and the setting of the reaction member of the hydrodynamic speed transformer assuming a fixed predetermined value, with the setting of the reaction member of the hydrodynamic speed transformer being chosen thereby optimizing speed guidance of the wind rotor, while the generator speed is substantially constant. The controller that controls the setting of the reaction member may be activated in normal operations above a fixed speed threshold of the wind rotor, with the speed of the wind rotor assuming a predetermined value or value range. The predetermined speed for the wind rotor can be determined by the third control level. The predetermined speed of the wind rotor assumes a substantially constant value.

The predetermined speed of the wind rotor may be determined based at least in part on a moment attacking the wind rotor. The controller that controls the angular position of the rotor blades and that controls the setting of the reaction member can be activated in normal operation under full load. The controller of the power electronics of the generator may be only activated based on a grid demand for power or reactive power. The controller of the second control level can be activated and deactivated thereby causing a graduated transition from one operating state to another operating state. The operating states may be selected from the group consisting essentially of a start phase, a synchronization phase, a stop phase, a load shedding, a short circuit, a demand for reactive power, a reduction in power and any combinations thereof. The operating states can be a partial load under parabolic power input and/or a full load.

In another exemplary embodiment, a method for the control of a wind power plant is provided comprising:
  a) controlling a setting of a reaction member of a hydrodynamic speed transformer in a first control level, with the first control level comprising a wind rotor with rotor blades, a power split gear driven at least indirectly by the wind rotor, a hydrodynamic speed transformer and a generator with power electronics, the power split gear having first and second power branches, the hydrodynamic speed transformer having a reaction member that takes up power from the first power branch and produces a feedback of power via the second power branch to the power split gear depending on a setting of the reaction member, the generator being driven at least indirectly by the first power branch and emitting electric power to the electric grid with constant system frequency;
  b) adjusting speed guidance for the power split gear and the hydrodynamic speed transformer based at least in part on power input of the wind rotor;
  c) controlling an angular position of the rotor blades or controlling the setting of the reaction member or controlling the power electronics of the generator via a controller in a second control level; and
  d) adjusting the controller at the second control level by activating and deactivating, weighting or predetermining according to setpoint characteristics via a third control level depending on operating states of the wind power plant or the electric grid or wind characteristics.

BRIEF DESCRIPTION OF THE DRAWINGS

The method and apparatus in accordance with the invention is described below in closer detail by reference to the figures, wherein.

DESCRIPTION OF THE INVENTION

The $p_R$ of a wind power plant is in connection in an approximated manner with the wind speed $v_w$:

$$p_R = k \; c_p(v_w, \omega_R, \beta) v_w^3 \qquad (1)$$

Various constants such as blade geometry and density of the air are combined here as k. $c_p$ further designates the power coefficient, which—as shown—depends on the wind speed $v_w$, the rotor speed $\omega_R$ and the angular position of the rotor blades, the so-called pitch angle. This power coefficient is characterized by a global maximum, which shifts towards higher rotor speeds $\omega_R$ in increasing wind speeds $v_w$.

Figure 3:
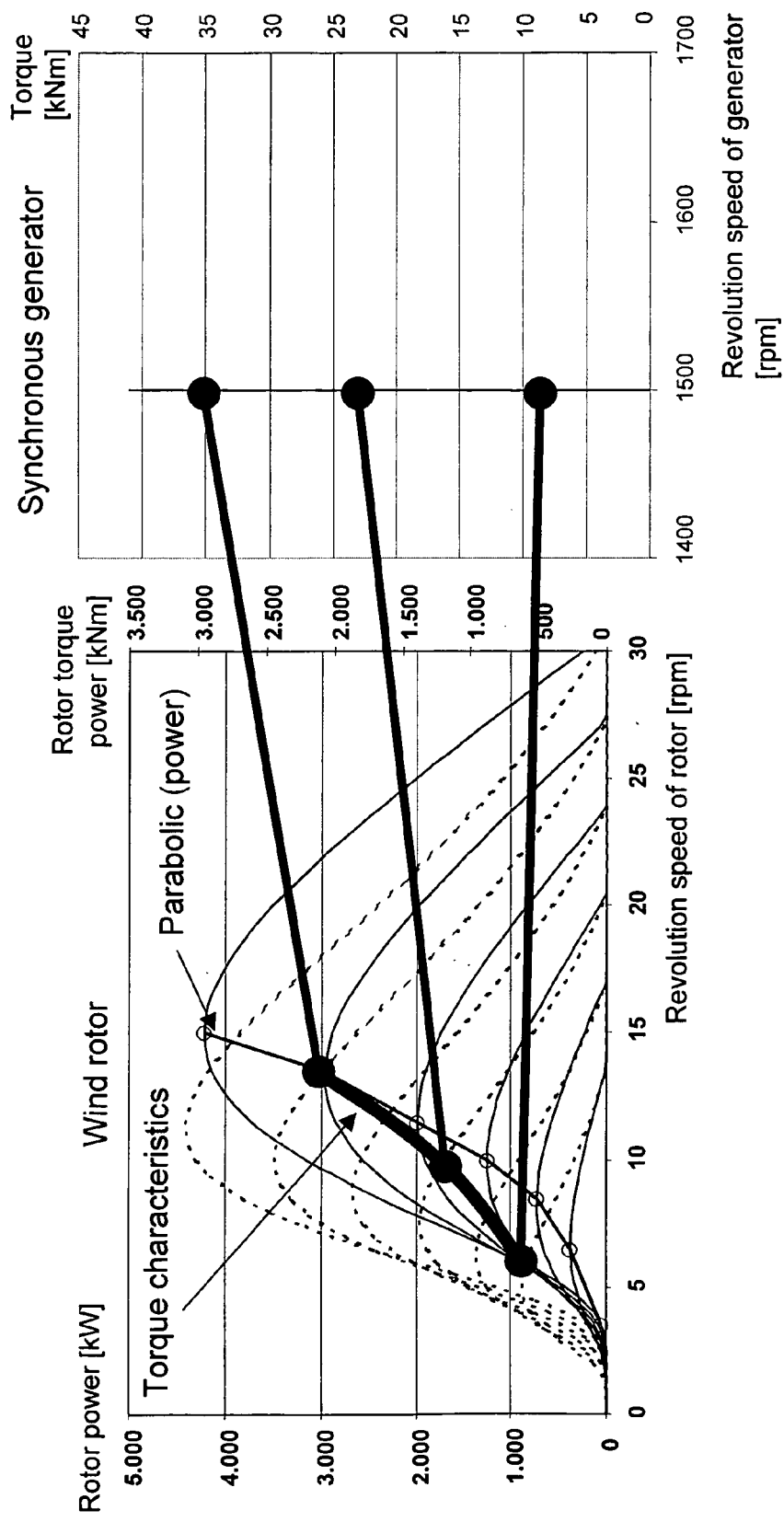
FIG. 3 schematically shows the active power curve at the best point of a wind power plant.

FIG. 3 shows in this connection the illustration of effective power of a wind rotor by considering different wind speeds. A set of curves (unbroken lines) is shown which represents in an exemplary manner the power taken up by a wind rotor with a diameter of 70 m from the air flow at a constant rotor blade pitch angle for the wind speeds of 18 m/s, 16 m/s, 14 m/s, 12 m/s, 10 m/s, 8 m/s. The displacement of the optimal rotor speeds towards higher values with rising wind speed is characteristic. The respective power maxima are situated on a curve, which is also known as parabolics. A speed guidance along said curve of optimal power input is designated below as efficiency-optimal speed guidance for the input shaft of the drive train in accordance with the invention. A speed-variable unit can thus be operated depending on the available wind speed at optimal power coefficients. In addition to the speed-variable operation under partial load, wind power plants are typically designed for certain rated outputs in conjunction with a rated speed which are each achieved and held at full load.

The torque of the wind rotor is shown in FIG. 3 on the basis of the set of curves shown with broken lines. The illustrated torque curves are associated with the respective powers depending on the wind speed, i.e. a torque value belongs to each efficiency-optimal speed, which torque value does not correspond to the maximum torque at the respective wind speed but assumes another value (cf. the torque input curve in FIG. 2 in bold print). With this torque, which is taken up by the wind rotor, the electric generator is driven via the drive train in accordance with the invention. From the torque/speed ratio for a synchronous generator shown in FIG. 3 it can be seen that a constant speed (in this example 1500 rpm) is predetermined and held on the driven side for an impressed mains frequency of 50 Hz on the driven shaft of the drive strand for the differently transmitted torques.

If an asynchronous generator is used instead of the synchronous generator, the situation is substantially similar because during operation in the linear range such a steep torque/speed ratio can be assumed that the speed of the driven shaft of the drive train has a substantially constant value.

Figure 2:
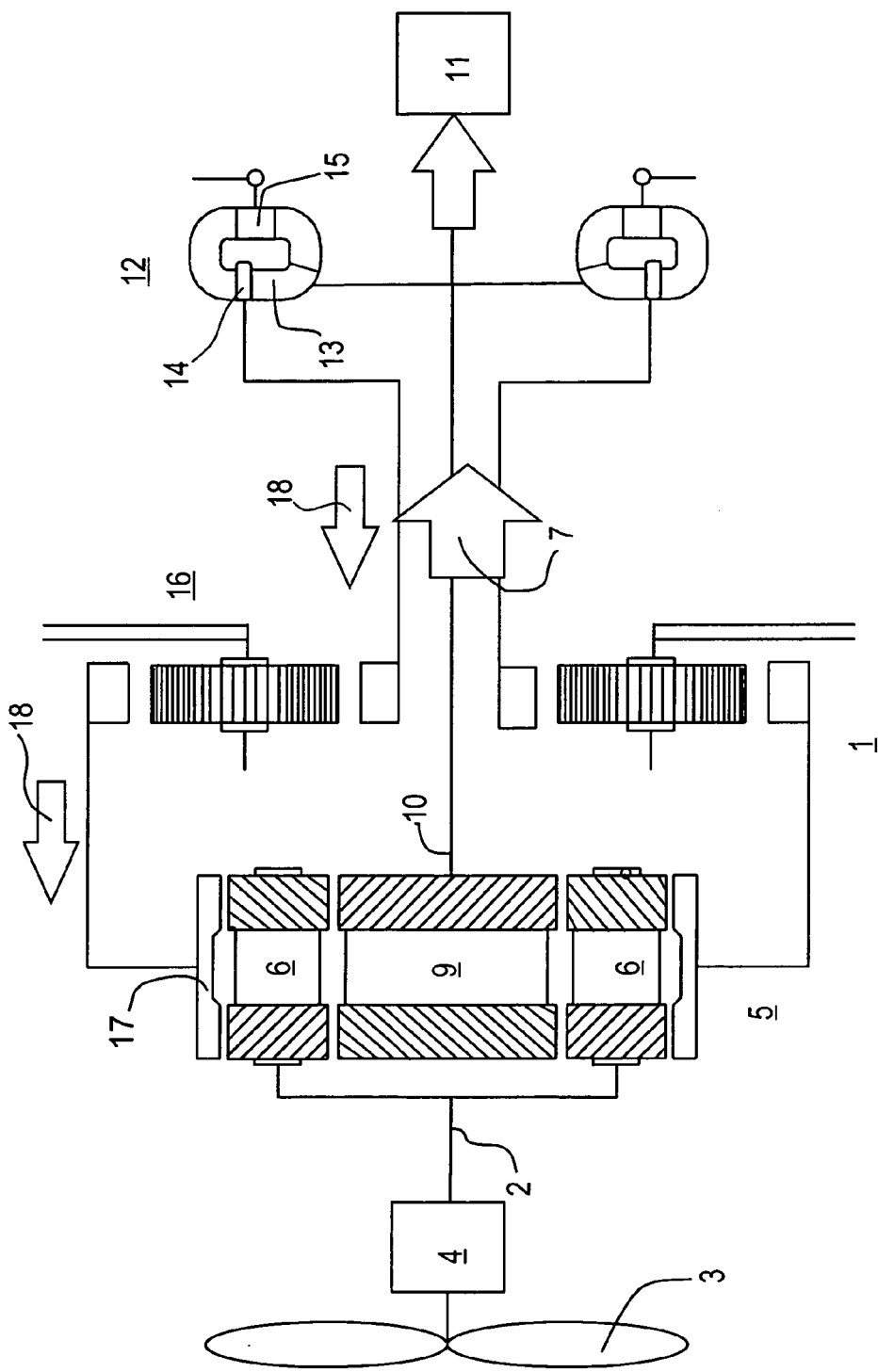
FIG. 2 shows a schematic representation of the first control level of a torque-divided wind power plant in accordance with the invention with a speed transformer on the driven side.

FIG. 2 shows a possible embodiment of a first control level in accordance with the invention, comprising a drive train 1 whose input shaft 2 is connected at least indirectly with the rotor 3 of a wind power engine. In the present case a gear 4 with a constant gear ratio is placed between the rotor 3 of the wind power engine and the input shaft 2. In the embodiment as shown here, a planetary gear is used as a power split gear 5 of the drive train 1, with the input shaft 2 being in connection with the planet carrier 6. There are now two power branches in the power split gear 5; the first power branch 7 guides power via the sun wheel 9 to the output shaft 10 of the drive train. Said output shaft 10 drives at least indirectly the electric generator 11 and is in operative connection with the hydrodynamic speed transformer 12. For this purpose the output shaft 10 is connected at least indirectly with the pump wheel 13 of the hydrodynamic speed transformer 12. A guide wheel with adjusting blades is used as a reaction member 15 in the hydrodynamic speed transformer 12 with which the power flow on the turbine wheel 14 can be set. There is a power backflow via the turbine wheel 14, which is guided via a second rigid planet wheel set 16, which on its part acts upon the external gearwheel 17 of the power split gear 5 and influences the gear ratio. This represents the second power branch 18 of the power split gear, which is used for power backflow.

The first control level in accordance with the invention is configured from a constructional viewpoint in such a way that by choosing the mechanical transmissions in the power split gear and by dimensioning the speed transformer, the parabolic characteristic of the optimal power input by wind rotor 3 is reflected. The starting point is that for each wind speed it is possible to state an ideal rotor speed for the maximum power input from the air flow. Reference is made in this respect to the preceding discussion in connection with FIG. 3. A constant output speed of the drive train for the electric generator is predetermined at the same time as a further precondition. In the present case this is 1500 rpm. The necessary revolving speeds of the gear components of the power split gear (e.g. the external gear and the sun wheel) can now be determined for every wind speed in the partial load range under consideration of the above preconditions. Notice must be taken that the drive train must reflect the parabolic power input characteristic for a substantially constant remaining position of the reaction member 15 of the hydrodynamic speed transformer 12.

Figure 4:
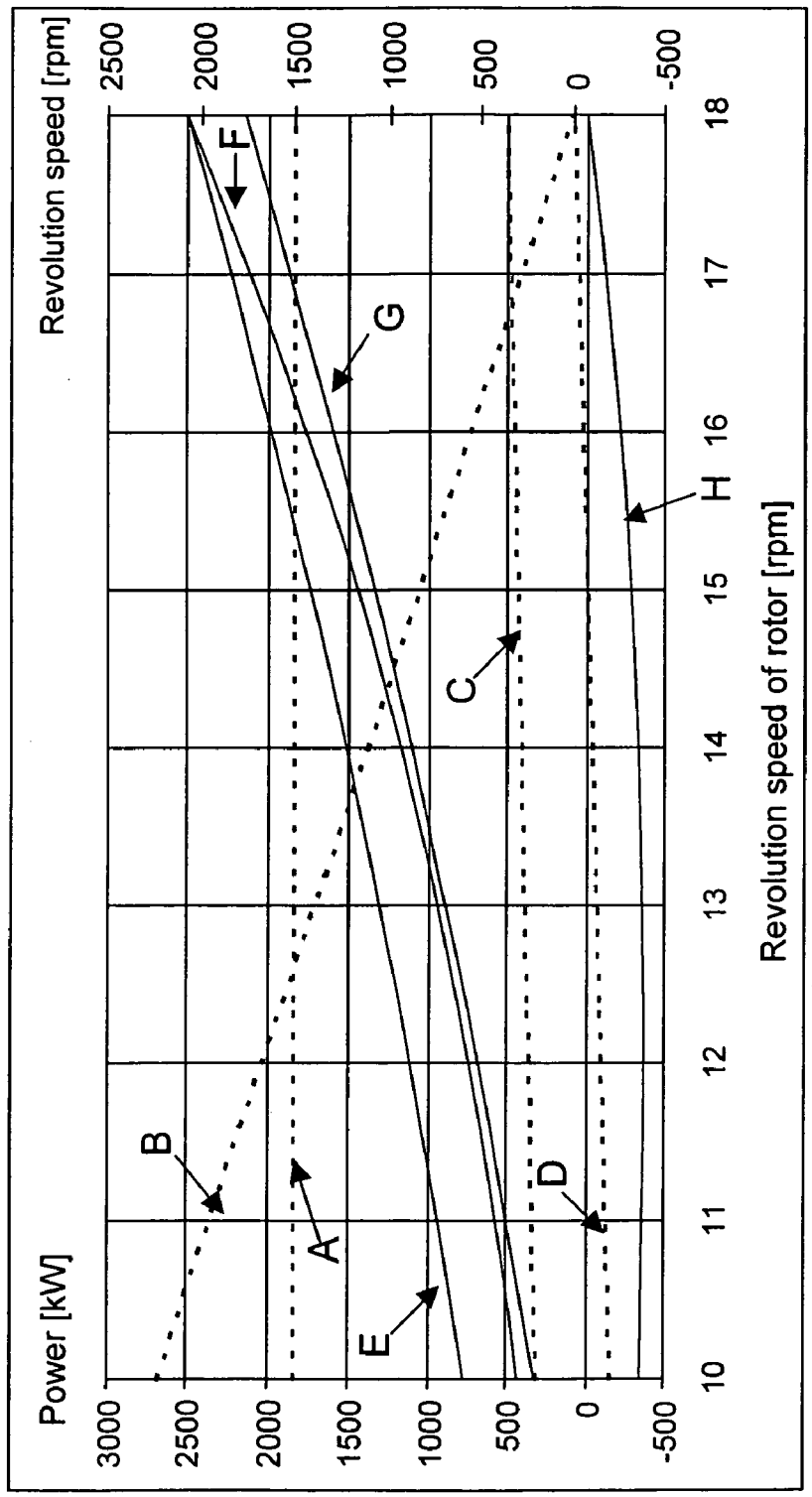
FIG. 4 shows the power flows and speeds of the individual branches of the mechanical hydrodynamic drive train of the first control level depending on the wind turbine speed.

FIG. 4 represents the speeds occurring on the drive train and the powers transmitted in the individual branches. In detail, curve A shows the speed of the driven shaft 10, curve B shows the speed of the turbine wheel 14 of the hydrodynamic speed transformer 12, curve C shows the speed of the input shaft 2 and curve D shows the speed on the external gear 17 of the power split gear 5. For the power flows, curve E represents the power taken up by the wind rotor, curve F is the power on the sun wheel 9, curve G is the power transmitted by the drive train and curve H states the power flowing back via the second power branch 18 from the hydrodynamic speed transformer 12 to the power split gear 5.

Figure 5:
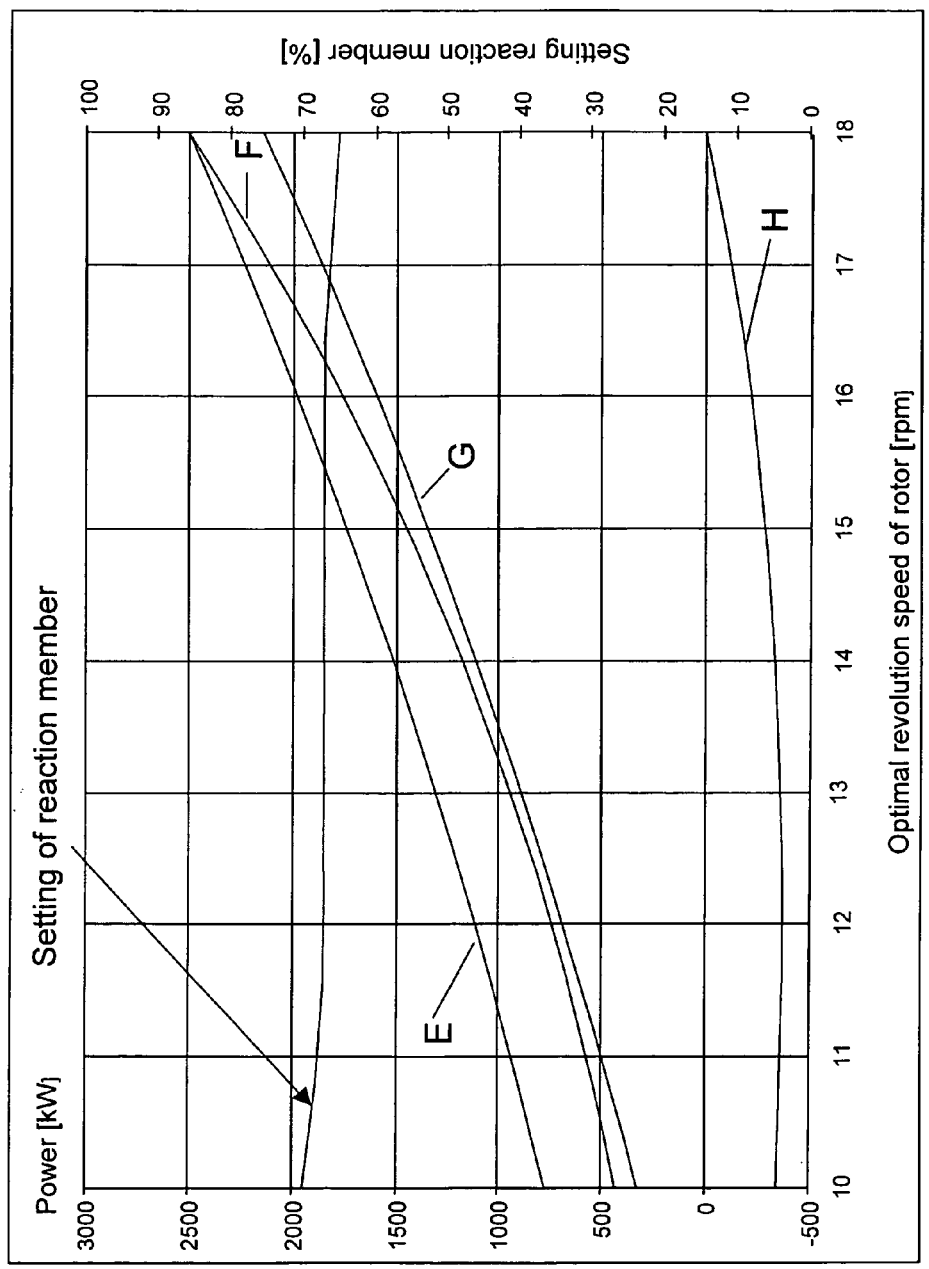
FIG. 5 shows the power flows and settings of the reaction member of the mechanical hydrodynamic drive train depending on the wind turbine speed.

FIG. 5 again shows the power flow for this embodiment and the setting of the reaction member, which in the present case is a guide wheel of the hydrodynamic speed transformer. The power flow curves E, F, G and H correspond to those of FIG. 4. It is clear that in the case of an optimal power input along the parabolics which can be recreated by the characteristics of the drive train, it is possible to work with a substantially evenly remaining guide blade position over the entire illustrated partial-load range. This setting is referred to below as the adjusted setting of the hydrodynamic speed transformer. No control of the reaction member is necessary in order to achieve the constancy of the output speed of the drive train for charging the electric generator at a simultaneous variable optimal wind rotor speed. Reference is hereby made in that the steepness of the parabola characterizing the power input can be set by the dimensioning of the transmission of the components of the power split gear in conjunction with the dimensioning of the speed transformer. This characteristic of the drive train in accordance with the invention is designated below as self-regulation.

Figure 1:
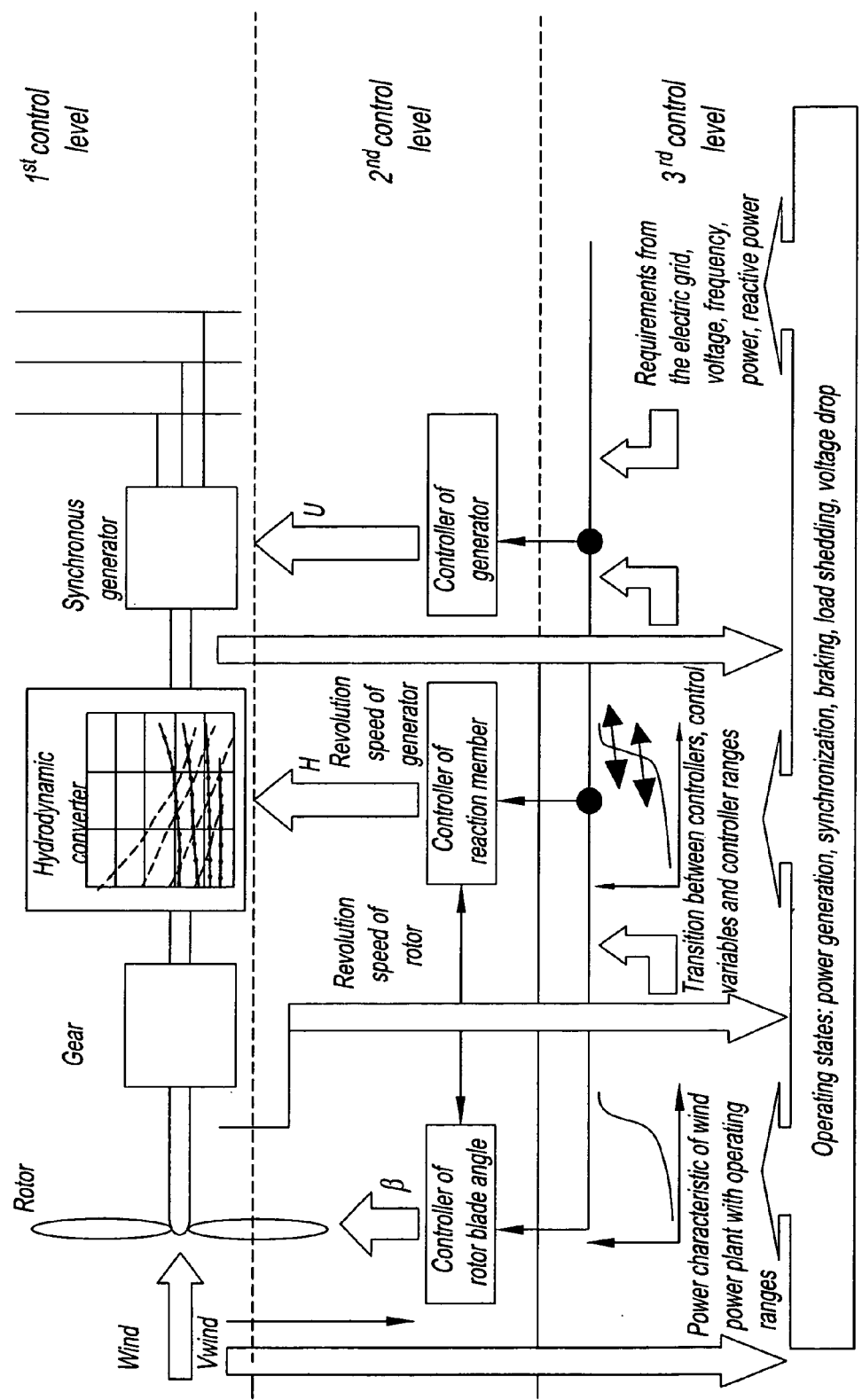
FIG. 1 shows three control levels in accordance with the invention for a wind power plant with hydrodynamic gear.

FIG. 1 shows a hierarchical configuration of the control levels for a wind power plant in accordance with the invention. The first control level is the self-regulating drive train with wind rotor and generator as described above. It is superimposed by the second control level, which comprises the controllers for the rotor blade angle, the position of the reaction member of the hydrodynamic speed transformer and a controller for the power electronics of the generator. A comparison of actual and setpoint value occurs in this second level for each of the mentioned controllers, whereupon the respective actuating signals are emitted.

Experience has shown that not every controller of the second control level activates for all operating ranges or operating states. A control of the controller activation and controller weighting as well as a graduated changeover between individual controllers is produced by the third control level. It not only chooses the variable to be controlled depending on the operating state or operating range, but it is also possible to use different controllers or different controller settings for one and the same variable, e.g. the rotor blade angle. This allows adjusting the control characteristics and control speed as well as the control quality to the respective special situation. Moreover, a setting of the setpoint controller values and the chosen operating points is obtained through the third control level as superordinate control level.

The choice of different controllers for the control level 2 for different operating ranges is explained by reference to FIG. 6. The moment taken up by the wind rotor depending on the rotor speed is shown. The illustration further shows a set of curves indicating the torque/speed ratio for different positions (H) of the reaction member of the hydrodynamic speed transformer.

The operating range designated with I represents the partial load range or parabolic load operation. Only the self-regulation of the first control level is applied in this partial load range, i.e. none of the controllers of the second control level is active. For this purpose, the reaction member is controlled in the first control level in such a way (meaning it is set to an optimal constant value) that the wind rotor is guided in an efficiency-optimal way with respect to its rotational speed and obtains the maximum power from the air stream.

Sensors and a respective sensor processing are assigned to the third control level for monitoring the efficiency-optimal guidance of the wind rotor in the partial load range or parabolic load range. For this purpose, the mean wind speed, the speed of the wind rotor and the generator speed are preferably acquired. It is further possible to monitor further operating parameters of the drive train and the generator and to estimate the same on the basis of a model. Based on this acquisition of the current operating range or the present operating state, default values can be sent to the second and first control level of the wind power plant by the third control level. Signal evaluation units are at the discretion of the person skilled in the art and can be configured as a bus system for example.

In the case of normal operation in the partial load range or parabolic load operation, it is determined by the third control level whether the first control level uses an optimal setting of the reaction member of the hydrodynamic speed transformer, which allows self-regulation along the parabolics. As explained above, this optimal setting of the reaction member is a system-inherent variable. However, it may also occur that the project configuration data for the wind power unit slightly depart from the actual operating conditions with respect to mean wind speed, geometry of rotor blade and the dimensioning of the hydrodynamic drive train, which is based on the same. In this case, a deviation from the efficiency-optimal guidance of the first control level can be detected by the third control level, whereupon respective adjustments need to be made. For this purpose the third control level will emulate the adjusting setting of the reaction member of the hydrodynamic speed transformer in the first control level and, if necessary, activate the controller for the angular position of the rotor blade in the second control level. A small deviation from the full attack position for the rotor blades will typically be chosen as the actual value, with the controller for the rotor blade position of the second control level merely supporting the self-regulation effect of the first control level. This subordination of the controller of the second control level is preferably also reflected in the settings of the control parameter, e.g. in the control time constants, which are set by the third control level in partial load operation for this case of normal operation.

Figure 6:
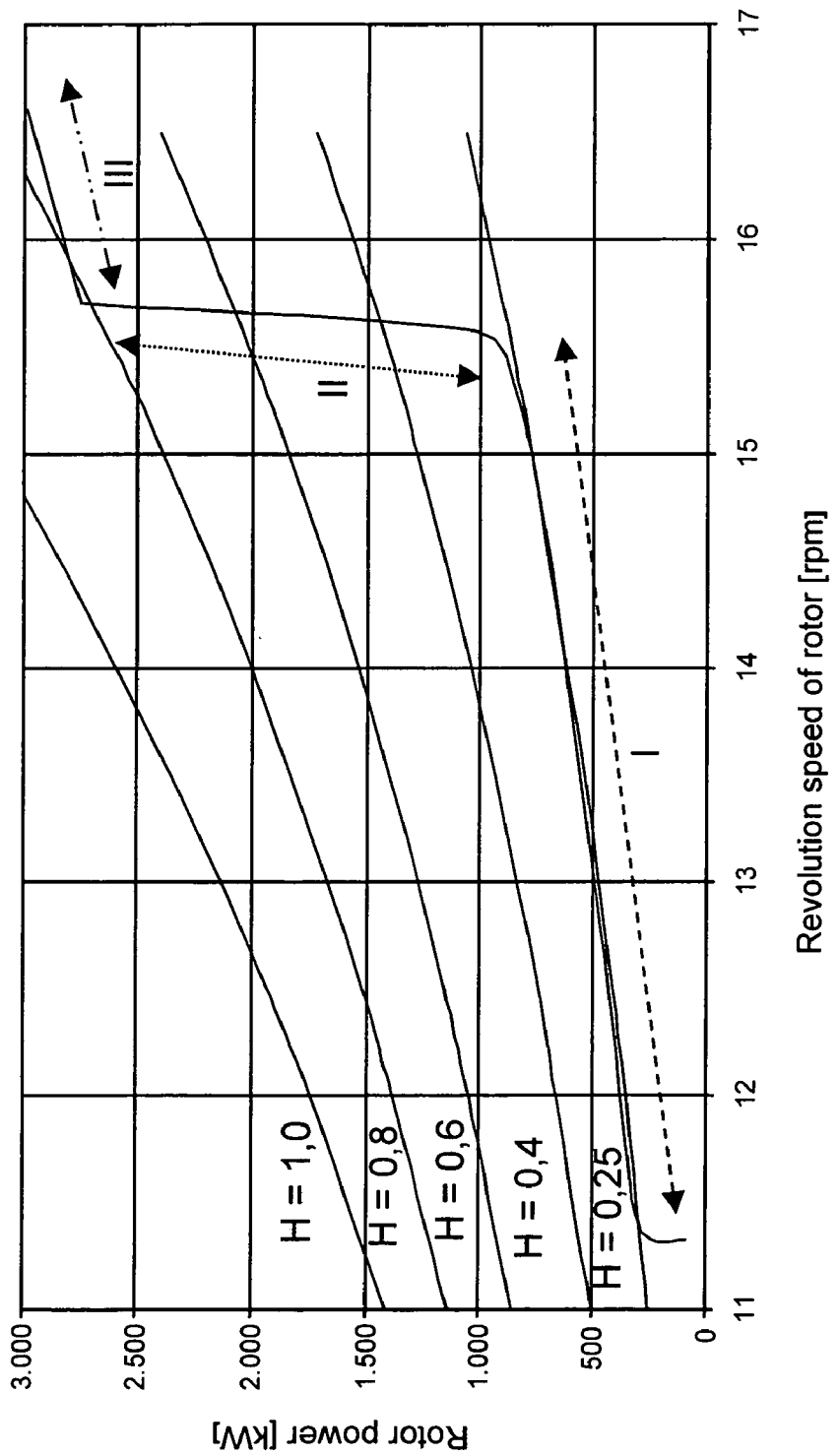
FIG. 6 shows different operating ranges for a wind power plant.
Figure 7A:
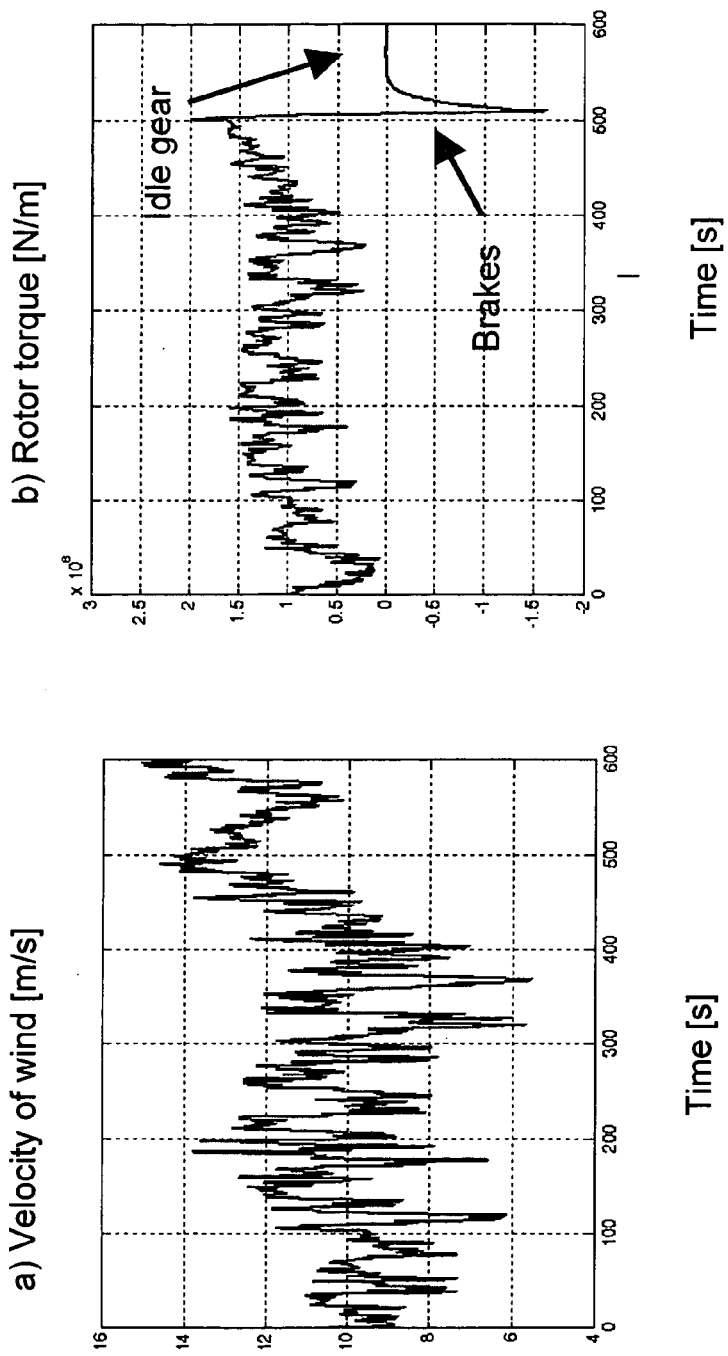
FIG. 7 shows different operating states for a wind power plant.
Figure 7B:
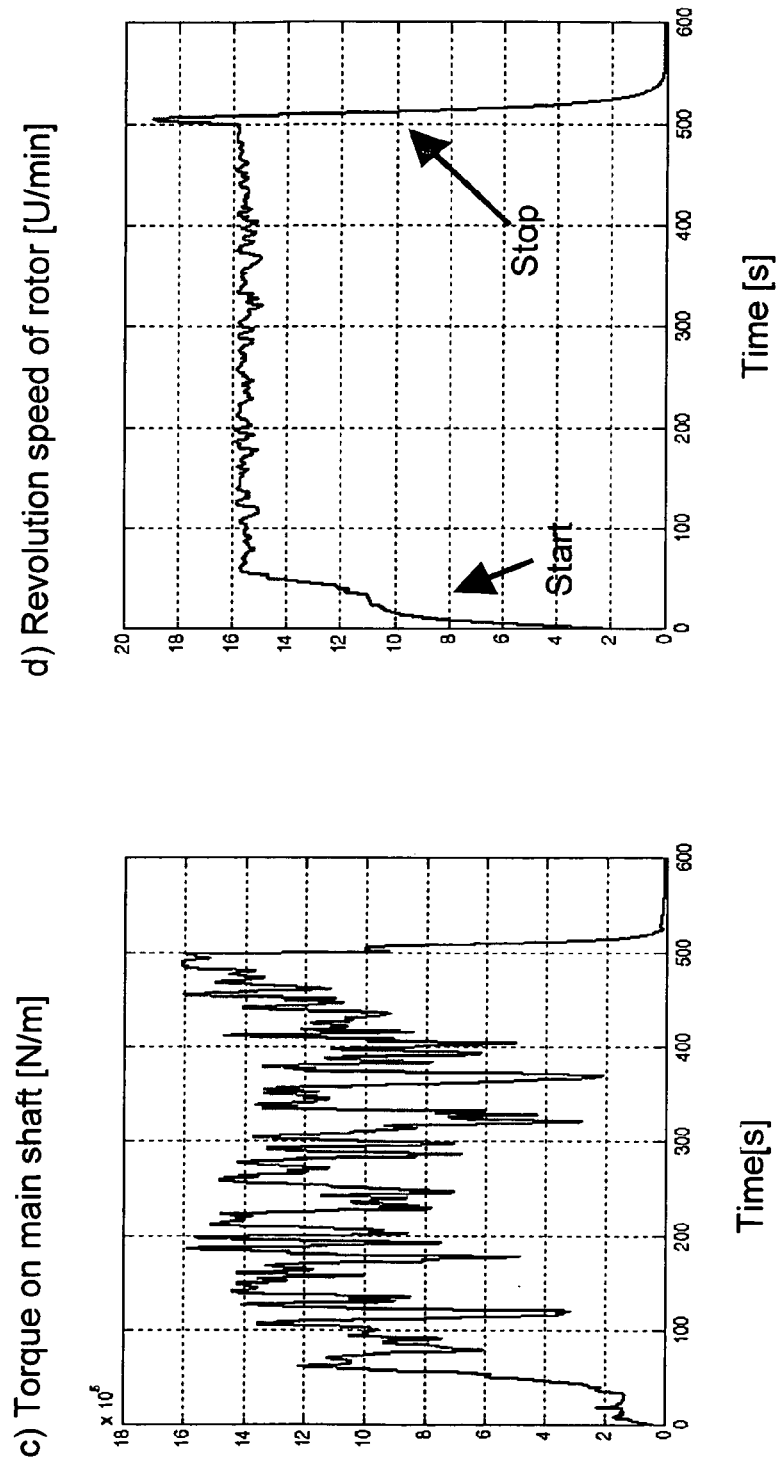
Figure 7C:
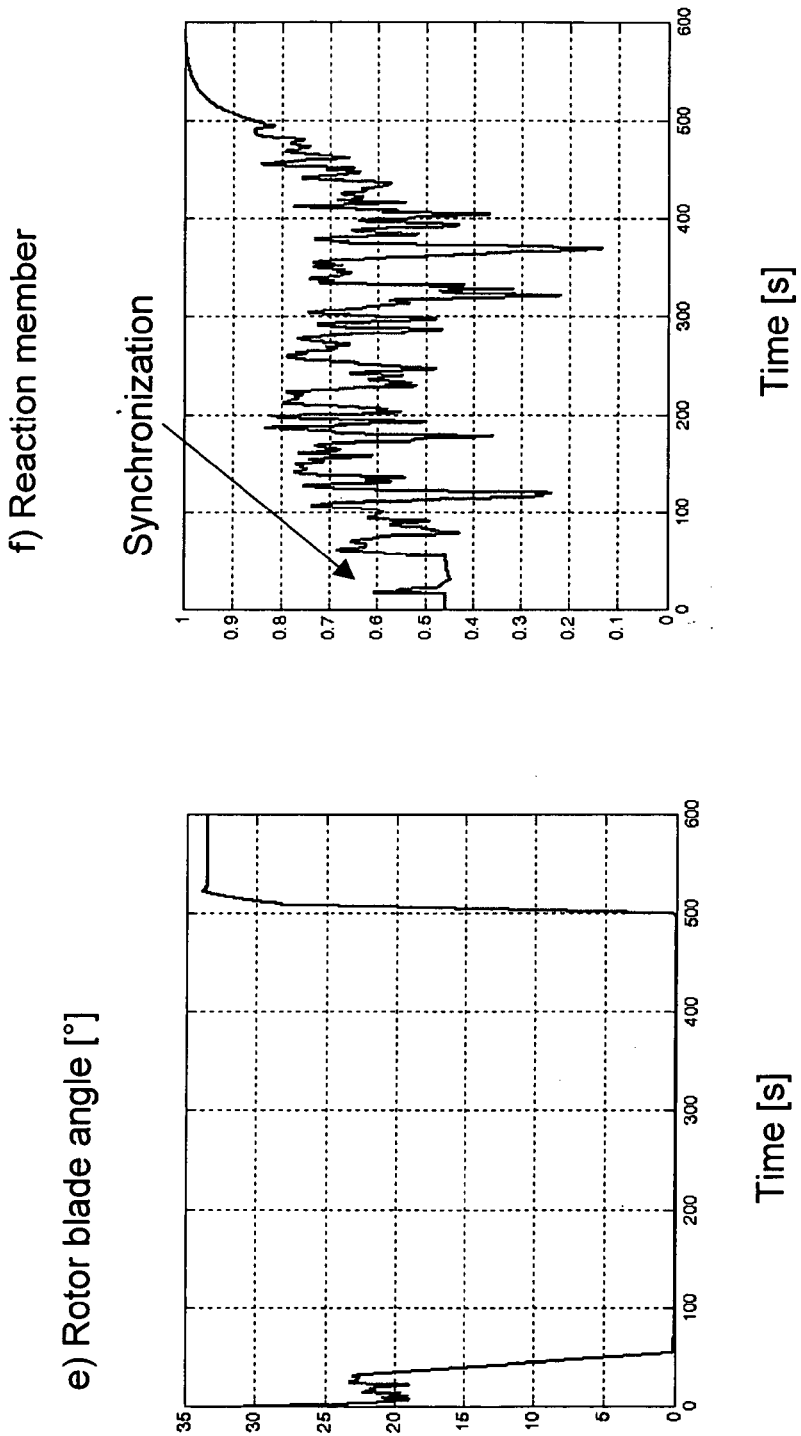

Above a certain speed threshold, which in the embodiment according to FIG. 6 corresponds to a speed of approximately 15.5 m$^{-1}$, the partial load range is left and the operating range with reduced rotor speed for noise limitation is reached. In this operating range designated with II, the control or setting to a constant value of the reaction member of the hydrodynamic speed transformer is replaced by a feedback control. This feedback control chooses the operating point for the reaction member in such a way that the speed is kept constant in the simplest of cases and is guided generally along a curve which depends on the torque taken up by the wind rotor. According to the predetermined setpoint speed of the wind rotor, the reaction member is now readjusted that as a result of the shifting of the return power flow to the second power branch the transmission ratios change in the power transmission gear and as a result of the constancy of the speed as impressed by the generator a certain setpoint speed is achieved in the first power branch of the power split gear. By making a respective setting of the controller characteristics it is now achieved that the controller readjusts this operating point as a result of a change of the mean wind speed and short-term changes as are produced by wind gusts lead to changes in the speed around this controlled operating point. The self-regulation characteristics of the first control level is used for this purpose and the impulses by the gusts are thus reduced within the terms of short-term energy storage and the short-term increases in the wind power are used for increasing the effective power transmitted by the drive train.

This selection, activation and weighting of the controllers for the second control level which are made for this noise-limited operating range II are performed in accordance with the invention by the third control level. For this purpose, the system and environmental measured variables, and in particular the rotor and generator speed, the generator output and the mean wind speed are processed in the third control level and the present operating range and operating state is determined and based thereon the settings, operating points and operating ranges for the first and second control level are set.

FIG. 6 further shows the transition to full load operation of a wind power plant, which is designated by the reference numeral III. The power input of the wind power plant must be kept constant. This is achieved by adding a controller from the second control level to the still used controller for the reaction member of the hydrodynamic speed transformer. This concerns a controller for the angular blade position of the wind rotor, a so-called pitch controller. The respective choice of controllers for the second control level is initiated in accordance with the invention by the third control level.

The operating range "speed-controlled range for noise reduction" which is marked in FIG. 6 with numeral II can assume different values depending on the place of erection of the wind power plant or can even be omitted for the offshore region for example, so that it is possible to move from partial load range or parabolic load operation I directly to power-limiting full load range III.

Based on different operating states of the wind power plant, which can be the start phase, stop phase, synchronization phase, there are further requirements to which the control system of the wind power plant needs to respond. Even in case of events or requirements in connection with the electric grid to which the system is coupled (this can concern a short circuit, power reduction or requirement for reactive power) there can be a choice of controllers by the third control level. It is preferable when in the case of such a grid requirement the power controller for the generator of the second control level is activated by the third control level.

A further example for the different controller activities is shown in the sequence of FIGS. 8a to 8f. This concerns the start and stop phase of a wind power plant. When the wind power plant starts up, the angular blade position is regulated in such a way that only a part of the maximum power is taken from the wind flow. This power is sufficient to achieve the acceleration of the wind power plant to a desired speed. The controller for the angular blade position of the wind rotor, the so-called pitch controller, is controlled in such a way that the unit reaches the region of the generator speed. The reaction member of the hydrodynamic speed transformer of the first control level is then controlled in such a way that the actual generator speed corresponds to the setpoint speed at a slight pole deviation. This setpoint (generator speed with slight pole deviation) is inherent value of the system and can therefore be predetermined. Similarly it is also possible to adjust this initial adjusting setting for the reaction member by a feedback control. Once the setpoint speed with slight pole deviation of the generator has been reached, there is a synchronization with the electric grid. After the synchronization there will be full power take-up by turning the rotor blade position into the wind. From this time the rotor blade position is preferably no longer actively controlled and remains at the predetermined value.

When initiating a braking phase, the rotor blade controller can be reactivated, which is shown in FIG. 8e for example. The rotor blades are turned out of the wind by adjusting the rotor blade pitch angle.

A possible operating state to which the third control level responds is a load shedding, as occurs in a sudden loss of a large consumer and especially in case of the interruption of a supergrid connection for reversing a grid instability. The wind power plant suddenly loses its energetic equilibrium. The active power supplied to the wind power plant by the air flow can no longer be supplied to the grid in the form of electric power. Rotor, hub and drive train are accelerated and the excess power is converted into kinetic energy of the rotating masses. If the rotational speeds of the rotating parts exceed the constructionally predetermined thresholds it is possible that the rotor, generator rotor, shafts and bearings are damaged or are destroyed completely. Damage to rotating parts principally represents a safety risk and needs to be avoided under all circumstances. In order to avoid such a safety-critical state, a separately provided feedback control algorithm is installed in the third control level as described above. The controllers of the second level are moved from the operating state valid at the time to the operating state of "load shedding". This operating state is principally characterized in that the blade angles are turned out of the wind with their maximum adjustment speed. This measure ensures that the power supplied to the wind power plant by the air flow is reduced as quickly as possible. After passing through the zero passage, energy is taken from the rotor. The unit is delayed for such a time until it has reached a secure operating state again. Furthermore, the controller for the reaction member in the torque converter is influenced in the second control level as described above in such a way that the generator rotor is accelerated as little as possible beyond its rated speed and can also be braked securely. For this purpose it is necessary to ensure that the hydrodynamic coupling in the torque converter assumes its highest value. The actuator in the torque converter is guided accordingly. These two control characteristics ensure that not only the rotor and generator rotor of the wind power plant but also the turbine in the superposition branch do not reach any excess speed, which is critical to safety or for causing damage.

The stator of the generator is connected at least indirectly for power transmission with the electric grid. If the production of electric power concerns a synchronous generator, its operational behavior can be influenced via the excitation voltage on the rotor. If a voltage dip occurs in the electric grid, the third control level as described above must influence the excitation control for the generator from the second control level in such a way that the wind power plant is subjected to the lowest possible load and the grid is supported in the best possible way.

The power taken by the rotor from the air flow and is supplied to the wind power plant is proportional to the so-called power coefficient $c_p$ and proportional to the third power of the wind speed. The wind speed, which is required for generating at least the electric nominal power, is also referred to below as nominal wind speed. If the prevailing wind speed exceeds the nominal wind speed, the active power supplied to the wind power plant from the air flow needs to be limited. For this purpose, the pitch controller is activated in the second plane through the third control level as described above, so that the pitch angle is increased according to the active power which is in excess of the rated power until the electric rated power of the wind power plant is no longer exceeded. Similarly, the pitch angle is decreased in the case of falling below the electric rated power until the power coefficient $c_p$ reaches its maximum and the rotor takes up the maximum power from the air flow.

As a result of the temporally changing behavior of the consumers in the electric grid, the grid operator may require an alternating demand of capacitive or inductive reactive power from the generating unit. This demand can simply be satisfied through a synchronous generator as an electric machine via excitation. For this purpose, the capacitive or inductive reactive power demand as requested by the grid operator is converted through the above-mentioned controller of the third level into a setpoint value of the excitation voltage of the excitation control of the second level. The excitation control of the second level ensures that the excitation voltage is influenced in the form that the reactive power transmitted by the wind power plant to the electric grid corresponds to the value required by the grid operator.

It is further possible, depending on useful life, load collectives and maintenance intervals, to introduce a hold-off operating state. This may concern an early twisting of the wind power plant out of the wind in case of gusty wind conditions, which is achieved through the rotor blade position. Moreover, a special operating state can be defined for the test phase after the erection of the wind power plant or for revision purposes. It is also possible that certain operating states of the wind power plant can occur at the same time, i.e. in combination, which then leads to an adjusted influence of the third control level on the second control level.

Figure 8:
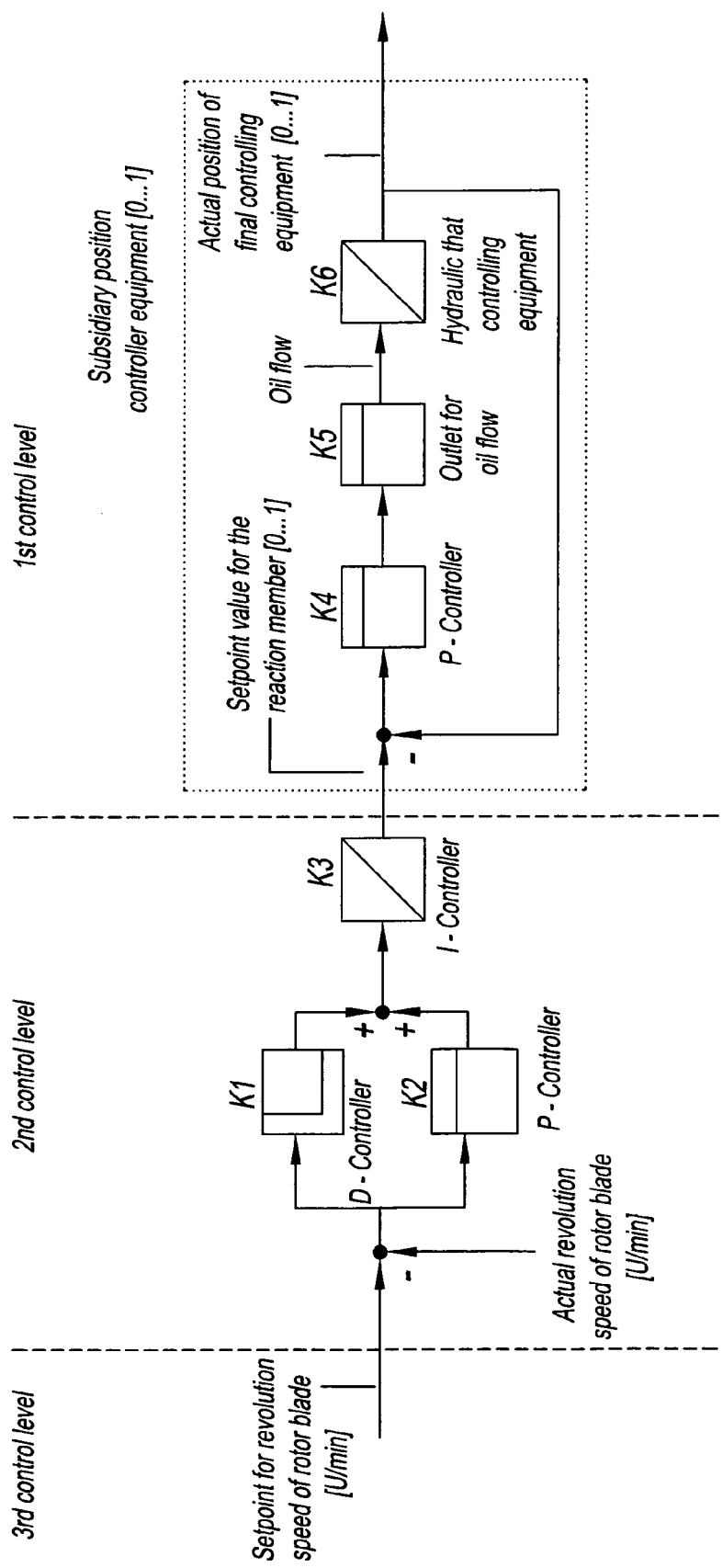
FIG. 8 outlines an embodiment of control of the reaction member of the hydrodynamic speed transformer for setting the speed of the wind rotor.

FIG. 8 shows an exemplary illustration of the configuration of the control of the wind power plant in at least three control levels as an example for the control of the reaction member of the hydrodynamic speed transformer. The operating area II of FIG. 6 is assumed, in which the speed of the wind rotor is guided for noise limitation. In the present simplified case, merely the controller of the reaction member of the hydrodynamic speed transformer of the second control level is activated for achieving this goal of the third control level, with a setpoint being predetermined by the third control level for the rotor blade speed. A comparison between actual value and setpoint value for the rotor speed is performed at the second control level, with the thus determined controller deviation representing the input variable of the controller for the reaction member of the hydrodynamic speed transformer. In the present case, a PD-controller with an I-controller connected in outgoing circuit is used. Within the scope of the invention it is possible to use a plurality of other control approaches such as a fuzzy control or state control.

As the output value, the controller for the reaction member of the hydrodynamic speed transformer predetermines a setpoint setting between the thresholds 0 and 1 for the first control level. An underlayed controller for the reaction member is used in the present embodiment in the first control level for setting to a certain predetermined value for the reaction member. In the present simplified case, a P-controller is used for this purpose, which controller acts upon the system of the actuating device for the reaction member. It has a system behavior, which is characterized in a simplified way by the proportional behavior of the oil flow depending on the position of the outlet opening and the integrating behavior of the hydraulic actuator.

The actual position of the reaction member influenced via the underlayed positioning controller acts back on the wind rotor in the aforementioned hydrodynamic drive train in accordance with the invention (which is not shown in FIG. 8) in conjunction with the generator. The feedback of the actual rotor speed for the setpoint/actual value comparison at the second control level is also not shown in detail.

The present invention having been thus described with particular reference to the preferred forms thereof, it will be obvious that various changes and modifications may be made therein without departing from the spirit and scope of the present invention as defined in the appended claims.

What is claimed is:

1. A wind power plant connectable to an electric grid comprising:
    a first control level having a wind rotor with rotor blades, a power split gear driven at least indirectly by the wind rotor, a hydrodynamic speed transformer and a generator with power electronics, the power split gear having first and second power branches, the hydrodynamic speed transformer having a reaction member that takes up power from the first power branch and produces a feedback of power via the second power branch to the power split gear depending on a setting of the reaction member, the generator being driven at least indirectly by the first power branch and emitting electric power to the electric grid with constant system frequency;
    a second control level having a controller that controls an angular position of the rotor blades or controls a setting of the reaction member of the hydrodynamic speed transformer or controls the power electronics of the generator; and
    a third control level activating and deactivating the controller of the second control level or predetermining setpoint characteristics for the controller of the second control level depending on operating states of the wind power plant or the electric grid or characteristics of the wind.

2. The wind power plant of claim 1, wherein the controller of the second control level is deactivated for a normal operating state and partial load conditions, wherein the angular position of the rotor blades and the setting of the reaction member of the hydrodynamic speed transformer assume a fixed predetermined value, with the setting of the reaction member of the hydrodynamic speed transformer being chosen thereby optimizing speed guidance of the wind rotor and the generator speed is substantially constant.

3. The wind power plant of claim 1, wherein the controller that controls the setting of the reaction member is activated in normal operations above a fixed speed threshold of the wind rotor, with the speed of the wind rotor assuming a predetermined value or value range.

4. The wind power plant of claim 3, wherein a predetermined speed for the wind rotor is determined by the third control level.

5. The wind power plant of claim 4, wherein the predetermined speed of the wind rotor assumes a substantially constant value.

6. The wind power plant of claim 4, wherein the predetermined speed of the wind rotor is determined based at least in part on a moment attacking the wind rotor.

7. The wind power plant of claim 1, wherein the controller that controls the angular position of the rotor blades and that controls the setting of the reaction member are activated in normal operation under full load.

8. The wind power plant of claim 1, wherein the controller of the power electronics of the generator is only activated based on a grid demand for power or reactive power.

9. The wind power plant of claim 1, wherein the controller of the second control level is activated and deactivated thereby causing a graduated transition from one operating state to another operating state.

10. The wind power plant of claim 1, wherein the operating states are selected from the group consisting essentially of a start phase, a synchronization phase, a stop phase, a load shedding, a short circuit, a demand for reactive power, a reduction in power and any combinations thereof.

11. The wind power plant of claim 1, wherein the operating states comprise a partial load under parabolic power input and a full load.

12. A method for the control of a wind power plant comprising:
    controlling a setting of a reaction member of a hydrodynamic speed transformer in a first control level, wherein the first control level comprises a wind rotor with rotor blades, a power split gear driven at least indirectly by the wind rotor, a hydrodynamic speed transformer and a generator with power electronics, the power split gear having first and second power branches, the hydrodynamic speed transformer having a reaction member that takes up power from the first power branch and produces a feedback of power via the second power branch to the power split gear depending on a setting of the reaction member, the generator being driven at least indirectly by the first power branch and emitting electric power to the electric grid with constant system frequency;
    adjusting speed guidance for the power split gear and the hydrodynamic speed transformer based at least in part on power input of the wind rotor;
    controlling an angular position of the rotor blades or controlling the setting of the reaction member or controlling the power electronics of the generator via a controller in a second control level; and
    adjusting the controller at the second control level by activating and deactivating, weighting or predetermining according to setpoint characteristics via a third control level depending on operating states of the wind power plant or the electric grid or wind characteristics.

* * * * *